United States Patent [19]
Cochran

[11] Patent Number: 5,738,155
[45] Date of Patent: Apr. 14, 1998

[54] TREE STUMP CUTTING APPARATUS

[76] Inventor: Gary Cochran, 3052 N. Forrest Lakes, Wichita, Kans. 67205

[21] Appl. No.: 781,239

[22] Filed: Jan. 10, 1997

[51] Int. Cl.⁶ .................................................. A01G 23/06
[52] U.S. Cl. ...................... 144/24.12; 37/302; 144/334; 241/101.72
[58] Field of Search .................. 144/24.12, 334; 37/302, 99, 189; 241/101.72, 101.74, 101.75

[56] References Cited

U.S. PATENT DOCUMENTS 4,690,183  9/1987  Eilerston ........................ 144/24.12
5,289,859  3/1994  Minton, Jr. et al. ............. 144/24.12

*Primary Examiner*—W. Donald Bray
*Attorney, Agent, or Firm*—Davis & Jack, L.L.C.

[57] ABSTRACT

A tree stump cutting and removing apparatus attachable to the lift arms of a skid steer front loader construction vehicle having an hydraulic power system, the tree stump cutting apparatus comprising a flying debris shielding plate having a plurality of attachment means on its back side adapting the flying debris shielding plate for fixed attachment to the lift arms of the skid steer front loader construction vehicle, and a cutting wheel extension arm, the cutting wheel extension arm being pivotally mounted upon the flying debris shielding plate, and positioned thereon to lie laterally to the side of the vehicle's operator's seat, allowing an operator of the apparatus a line of sight for viewing and controlling stump cutting performed by the apparatus.

24 Claims, 4 Drawing Sheets

TREE STUMP CUTTING APPARATUS

FIELD OF THE INVENTION

This invention relates to auxiliary tree stump cutting devices adapted for attachment to the lift arms of skid steer loader construction vehicle, such devices typically being powered by the hydraulic power system of the skid steer loader.

BACKGROUND OF THE INVENTION

Tree stump cutters are one example of several hydraulically powered auxiliary implements commonly attachable to the forward ends of the lift arms of skid steer loader construction vehicles. In normal use, a skid steer loader has a loader bucket pivotally attached to and spanning between its lift arms, the loader bucket functioning to move and disburse dirt, rocks and debris. The loader bucket of a skid steer loader may be easily removed and alternate or auxiliary implements such an auger, a jack hammer, or a stump cutter may be attached in its place. Such auxiliary implements commonly are powered by the skid steer loader's hydraulic power system. Such auxiliary implements attachable to the lift arms of a skid steer loader are commonly mounted and positioned at a centrally located point between the forward ends of the lift arms. Central mounting of tree stump cutting auxiliary implements between the lift arms of a skid steer loader has several functional disadvantages. One disadvantage is that an equipment operator seated at the operator's seat of the skid steer loader has no line of sight for viewing the stump cutting wheel of the implement as it impinges upon a stump. The lack of a direct line of sight makes it difficult for the equipment operator to accurately control the stump cutting wheel. Another disadvantage is that rocks and wood chips are often forcefully thrown to the rear directly toward the equipment operator. An equipment operator's direction of access to the operator's seat of a skid steer loader is from the front, passing between the lift arms. Central mounting of a stump cutting implement is a disadvantage because an operator seeking access to the vehicle's operator's seat must step on or over the implement, creating a risk of injury to the operator by slipping or falling upon the implement.

The present invention eliminates the above disadvantages by providing apparatus for a side pivotal mounting of a stump cutting wheel extension arm, providing a skid steer loader operator a line of sight to view the stump cutting wheel, by directing flying debris away from the skid steer operator, and by allowing the skid steer operator easy excess to the operator's seat. The present invention further provides additional maneuverability, and accessibility to tree stumps in tightly spaced positions.

PRIOR ART PATENTS

U.S. Pat. No. 3,732,905 issued May 15, 1973, to Pickel discloses a stump removing apparatus approximately centrally mounted upon the back side of a tractor.

U.S. Pat. No. 4,709,736 issued Dec. 1, 1987, to Bellars discloses a stump removing apparatus approximately centrally mounted upon the back side of a tractor.

U.S. Pat. No. 5,435,359 issued Jul. 25, 1995, to Craft discloses a stump removing apparatus approximately centrally mounted behind a tractor.

None of the above patents teach or disclose the novel, unique, and useful aspects of the present invention.

SUMMARY OF THE INVENTION

The present inventive tree stump cutting apparatus comprises a flying debris shielding plate serving as a major support structure of a width sufficient to span between the forward ends of the lift arms of a skid steer loader construction vehicle, and being approximately 2½ feet in height. The back side of the shield plate has a pair of pin and clevis joints fixedly attached thereto at either end of the shield plate, the pin and clevis joints being aligned and fitted for attachment to the forward ends of the skid steer loader's lift arms, and for attachment to the skid steer loader's bucket control hydraulic cylinders. A horizontal pivot column is pivotally attached by means of a widely space first pin and clevis joint to the front side of the shield plate, the attachment preferably being at either the far right or the far left side of the shield plate; the pivotal attachment enabling the horizontal pivot column to pivot in a horizontal plane. A cutting wheel extension arm is pivotally attached to the lower end of the horizontal pivot column by means of a second pin and clevis joint, the second pin and clevis joint providing for pivotal motion of the cutting wheel extension arm within a vertical plane. The combined actions of the first and second pin and clevis joints provides for universal motion and positioning of the cutting wheel extension arm.

The horizontal pivot column must be spaced a sufficient horizontal distance away from the midpoint of the shield plate to provide an equipment operator seated in the skid steer loader's operator's seat a line of sight for viewing the cutting wheel as it cuts away a tree stump. Such side spacing should at least place the base of the cutting wheel extension arm laterally to the side of the operator's seat so that a vertical plane extending rearward from the base of the extension arm will pass to the side of the operator's seat.

Vertical pivotal motion of the cutting wheel extension arm is controlled and provided by a first double acting arm positioning hydraulic cylinder spanning between a first pin and clevis joint connecting the base of said hydraulic cylinder to the upper end of the horizontal pivot column and a second pin and clevis joint connecting the ram of said hydraulic cylinder to the upper surface of the forward end of the cutting wheel extension arm.

Pivotal motion of the cutting wheel extension arm in a horizontal plane is controlled and provided by a second double acting arm positioning hydraulic cylinder spanning between a first swivel pin attached to the upper edge of the shield plate and a second swivel pin attached to a lever arm extending from the upper end of the horizontal pivot column.

Through the operation of the first and second hydraulic arm positioning cylinders, an hydraulic motor driven stump cutting wheel rotatably mounted upon the front end of the cutting wheel extension arm may be universally selectively maneuvered upwards, downwards, leftwards, and rightwards, allowing the teeth of the cutting wheel to cut away a tree stump.

Hydraulic pressure and fluid flow is preferably supplied to the stump cutting apparatus by the power forward hydraulic line of the skid steer loader's hydraulic power system. Hydraulic pressure and flow from the power forward line is initially controlled by an on demand priority flow control valve, which in its normal unactuated position allows unrestricted flow of hydraulic oil to the hydraulic motor driving the stump cutting wheel. The first and second arm positioning hydraulic cylinders are controlled by a pair of three position five port arm position control valves which in their normal positions are closed to flow, the fifth port of each such valve being a load signaling port. A branched load signaling line extends from the on demand priority flow control valve to the load signaling ports of the two arm position control valves. Upon actuation of either of the arm position control valves, a pulse of hydraulic pressure is sent along the load signaling line to the on demand priority flow control valve, actuating said valve and causing it to divert hydraulic fluid flow from the hydraulic motor to the arm position control valves.

The arm position control valves are remotely actuatable from the operator's seat of the skid steer loader through lever controlled cable connections, the levers being supported by an adjustable lever support arm extending from the upper end of a lever support column into the operator's compartment of the skid steer loader; the lower end of the lever support column being fixedly attached to the back of the shield plate.

In operation, when a stump cutting apparatus as described above is attached to the lift arms and bucket control cylinders of a skid steer loader and when the power forward hydraulic pressure and return lines of the skid steer loader are attached to the stump cutter's hydraulic power system, the cutting wheel of the stump cutter may be maneuvered into place over a tree stump by driving and positioning the skid steer loader. The hydraulic motor driven the stump cutting wheel is then actuated. The cable controlled arm positioning valves are then actuated by the equipment operator through manipulation of the arm positioning levers to cause the cutting teeth of the stump cutting wheel to impinge upon and cut away the stump. Through forward and reverse motion of the skid steer and through side to side and vertical motion of the cutting wheel extension arm, an entire tree stump may be ground away to a level at or below ground level.

The side positioning of the cutting wheel extension arm allows an operator seated in the skid steer loader operator's seat to view the stump cutting wheel as it impinges upon a tree stump, allowing the operator to accurately control the motion of the cutting wheel. The side installation of the cutting wheel extension arm also effectively directs debris, wood chips, and rocks thrown by the stump cutting wheel in a path passing to the side of and away from the operator. The side installation of the cutting wheel extension arm further provides for easy access of an operator over the shield plate to the operator's seat of the skid steer loader, reducing the risk of slipping and falling while stepping on or over the cutting wheel extension arm. Additionally, the side installation of the cutting wheel extension arm enhances the maneuverability of the stump cutting implement to reach tree stumps which are in remote or tightly spaced locations. Accordingly, it is an object of the present invention to provide an auxiliary tree stump cutting implement for attachment to the lift arms of a skid steer loader, providing the operator of the skid steer loader a line of sight to its stump cutting wheel for enhanced accuracy in cutting of tree stumps.

It is a further object of the present invention to provide an auxiliary tree stump cutting implement for attachment to the lift arms of a skid steer loader, which directs away from the operator flying rocks and other debris thrown by its stump cutting wheel.

It is a further object of the present invention to provide an auxiliary tree stump cutting implement for attachment to the lift arms of a skid steer loader, which provides for easy access by the operator to the operator's seat of the skid steer loader.

It is a further object of the present invention to provide an auxiliary stump removing implement for attachment to the lift arms of a skid steer loader, providing enhanced maneuverability and accessibility of the stump cutting implement to tree stumps located in tight or closely spaced locations.

Other and further objects and benefits of the present invention shall become apparent upon review of the detailed description which follows, and upon review of the appended drawings.

DETAILED DESCRIPTION

Figure 1:
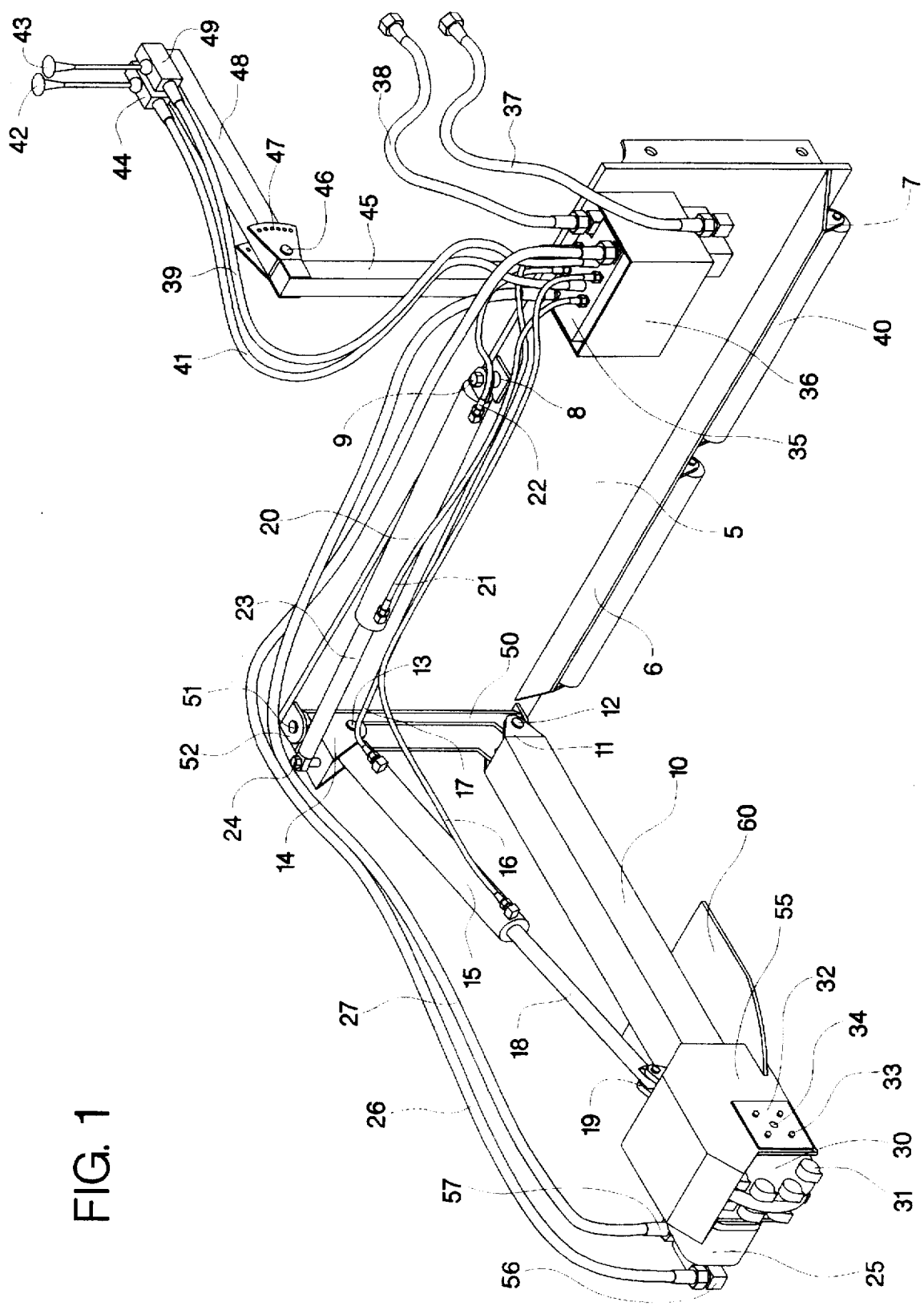
FIG. 1 is a perspective view of the stump cutting apparatus.
Figure 3:
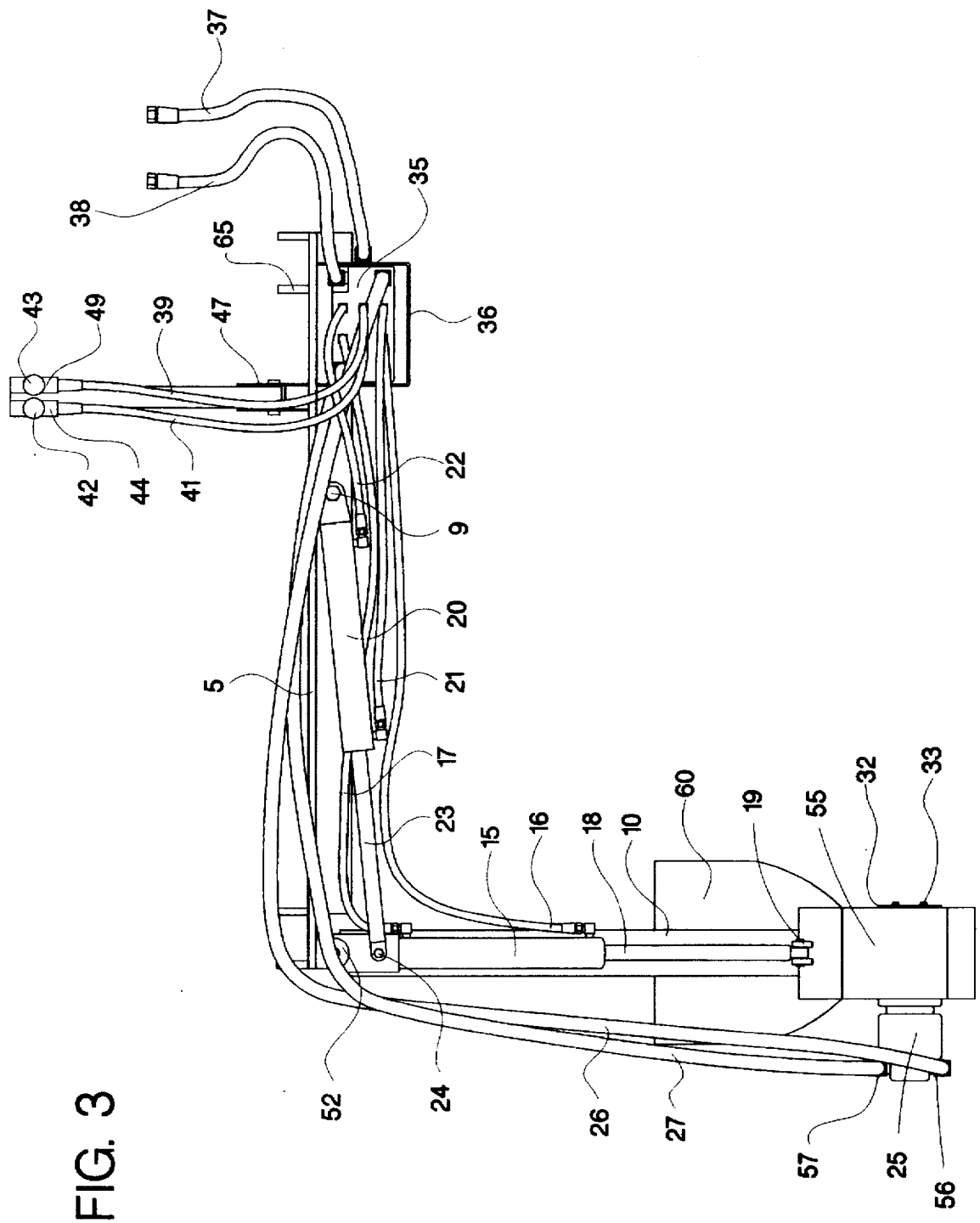
FIG. 3 is a plan view of the stump cutting apparatus.

Referring now to the drawings, and in particular to FIG. 1, a flying debris shielding plate 5 is provided as the major support structure for supporting a cutting wheel extension arm 10, and for providing a means of attachment of the apparatus to the lift arms and bucket control cylinders of a skid steer loader construction vehicle. Referring to FIG. 3, two pairs of clevis joints 65 are provided at either end of the shield plate 10, allowing the stump cutting apparatus to be fixedly attached by means of pins to the lift arms and to the bucket control cylinders of a skid steer loader having a hydraulic power system.

Referring again to FIG. 1, the cutting wheel extension arm 10 is pivotally mounted at the extreme right end (or alternately left end) of the shield plate 5 by means of a horizontal pivot column 50, the horizontal pivot column 50 providing pivotal motion in the horizontal plane by means of a widely spaced clevis joint 52 which is pivotally affixed at its upper and lower ends by column supporting pins 51.

Pivotal motion of the extension arm 10 in a vertical plane is provided by a clevis joint 11 at the base of the extension arm 10, the clevis joint 11 being pivotally mounted at the lower end of the horizontal pivot column 50 by means of an attachment pin 12. Vertical pivotal motion of the extension arm 10 is provided and controlled by a first two way hydraulic arm positioning cylinder 15, the base of which is pivotally mounted upon the upper end of the horizontal pivot column 50 by means of a pin 13, and the ram 18 of which is pivotally mounted at the forward end of the extension arm 10 by means of a pin and clevis joint 19.

Pivotal motion of the extension arm 10 in a horizontal plane is provided and controlled by a second two way hydraulic arm positioning cylinder 20, the base of which being pivotally attached by means of a pin 9 to a cylinder support flange 8 extending from the upper edge of the shield plate 5. The upper end of the horizontal pivot column 50 has a perpendicular protrusion forming a lever arm 14 to which the ram 23 of the second arm positioning hydraulic cylinder 20 is pivotally attached by means of second pin 24.

Figure 2:
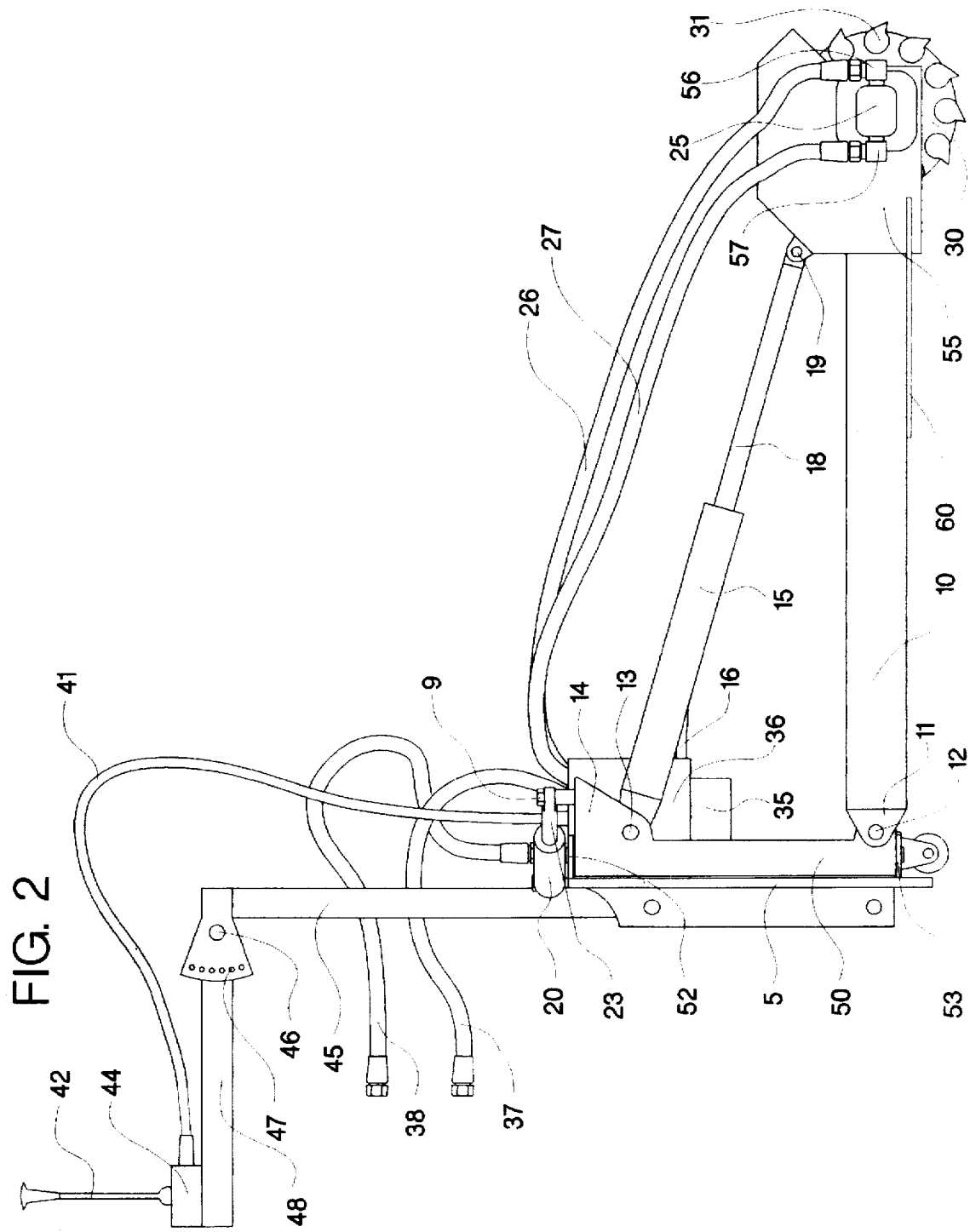
FIG. 2 is a sideview of the stump cutting apparatus.

Referring to FIG. 2, the cutting wheel extension arm 10 has rotatably mounted at its forward end a stump cutting wheel 30, the wheel having a multiplicity of stump cutting teeth for cutting away the wooden material of a tree stump. As viewed, the stump cutting wheel 30 is rotatably driven clockwise by a hydraulic motor 25. The stump cutting wheel 30 has a protective shroud 55, and, referring to FIG. 1, has a ricochet guard 60 for protection from flying rocks and wood chips.

Figure 4:
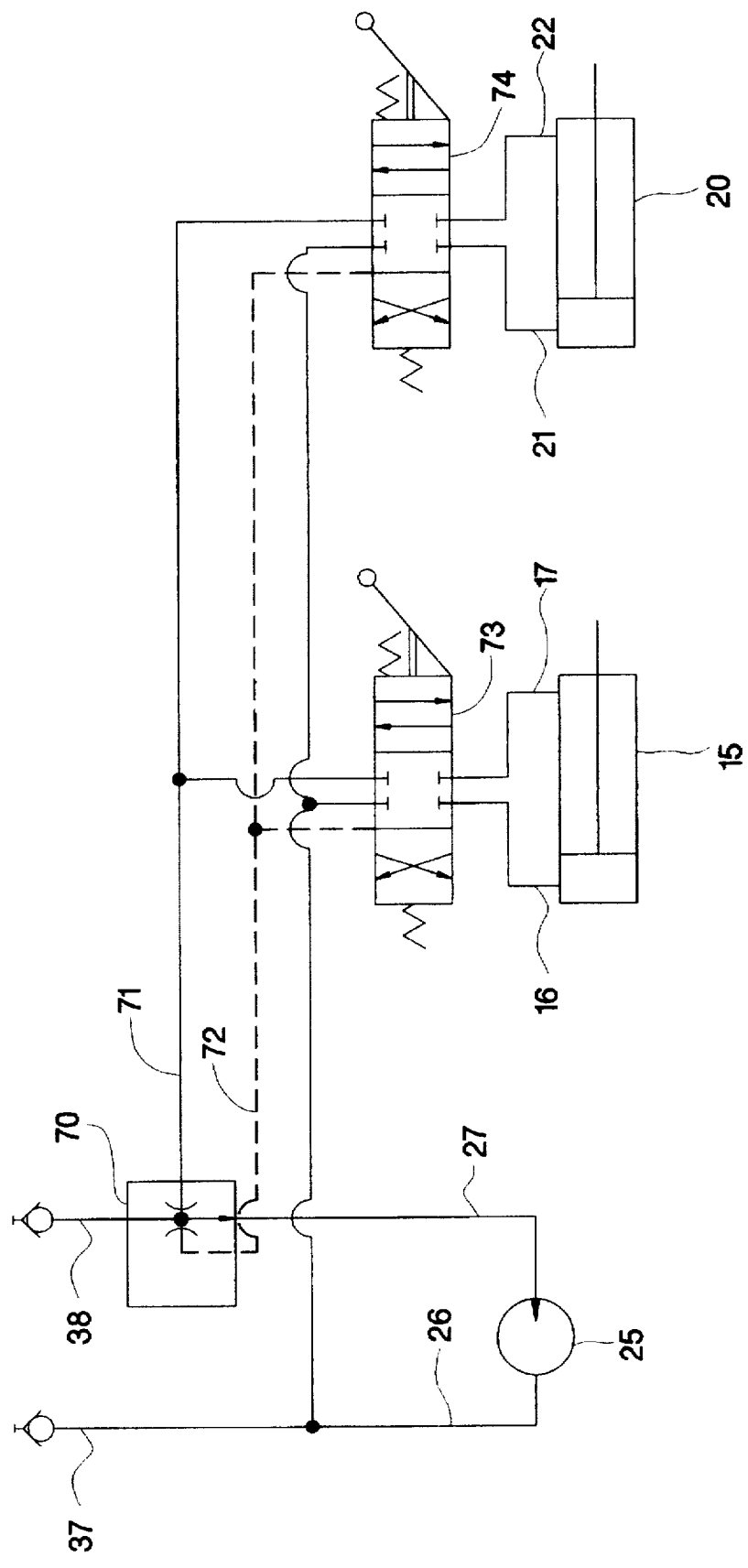
FIG. 4 is a hydraulic schematic diagram of the hydraulic system of the stump cutting apparatus.

Referring to the hydraulic schematic appearing as FIG. 4, the arm positioning cylinders 15 and 20 are controlled by a pair of three position five port arm control valves 73 and 74, each having a normal position closed to flow of hydraulic fluid. Upon actuation of either arm positioning valve 73 or 74, a pulse of hydraulic pressure passes through an hydraulic load signaling line 72 to an on demand priority flow control valve 70. While the on demand priority flow control valve 70 is in its normal unactuated position, hydraulic pressure and fluid flow from the hydraulic power system of the skid steer loader passes freely through its power forward line to a high pressure line 38, and into an hydraulic motor high pressure line 27, powering the hydraulic motor 25. Hydraulic fluid then returns to the oil reservoir of the skid steer loader's hydraulic system through return lines 26 and 37. Actuation of either of the arm control valves 73 or 74 sends an actuating pulse of hydraulic pressure to the on demand priority flow control valve 70 through the load signaling line 72. Upon transmission of such an actuating pulse of hydraulic pressure through the load signaling line 72, the on demand priority flow control valve 70 diverts a predetermined amount of hydraulic fluid flow to an arm control cylinder high pressure line 71. According to the function of the on demand priority flow control valve 70, a supply of power to the arm positioning cylinders 15 and 20 is assured. In the event there is insufficient hydraulic fluid flow in the high pressure line 38 to drive both the arm positioning cylinders 15 and 20 and the hydraulic motor 25, fluid flow to the hydraulic motor 25 is reduced while constant fluid flow to the arm positioning cylinders 15 and 20 is maintained. Referring simultaneously to FIGS. 3 and 4, the arm control valves 73 and 74, the on demand priority flow control valve 70, the load signaling line 72, and the arm control cylinder high pressure line 71 are all contained within a valve box 35, the valve box being covered by a protective shroud 36.

Referring to FIG. 1 and FIG. 4, arm control valves 73 and 74 are remotely mechanically actuatable by means of connector cables 41 and 39, the cores of which are slidable and capable of being alternately driven or pulled through manual manipulation of arm position control levers 42 and 43 which respectively function to actuate cable pulling and pushing mechanisms 44 and 49. The arm position control levers 42 and 43 are supported by a lever support arm 48 which is adjustably mounted upon a control support column 45 by means of a swivel pin 46 and an adjustment pin 47; the control support column 45 being fixedly mounted upon the back side of the shield plate 5.

Referring to FIG. 1, while hydraulic pressure and fluid flow is provided by the power forward hydraulic line of the skid steer loader to the high pressure line 38, and while arm position control levers 42 and 43 are at rest in their central positions, hydraulic fluid flows, referring to FIG. 4, through the on demand priority flow control valve 70, and then, referring again to FIG. 1, into an hydraulic motor high pressure line 26 to enter and power the hydraulic motor 25 through a hydraulic motor high pressure inlet port 56. The hydraulic fluid then returns at low pressure through a low pressure return line 27, passing through the valve box 35 to return to the hydraulic fluid reservoir of the skid steer loader through a main return line 37.

Referring simultaneously to FIGS. 1 and 4, manipulation of either of the arm position control levers 42 or 43 remotely actuates arm control valves 73 or 74 through actuation cables 41 or 39. Upon actuation of either of the arm control valves 73 or 73, the on demand priority flow control valve 70 in response to a pulse of hydraulic pressure from the load signaling line 72 diverts hydraulic fluid flow from the hydraulic motor high pressure line 26 to the arm control cylinder high pressure line 71. Upon the provision of flow of hydraulic fluid to the arm control cylinder high pressure line 71, the arm control cylinders 15 and 20 may be remotely controlled through manual manipulation of the arm position control levers 42 and 43.

Referring to FIG. 1, a skid steer loader having the apparatus as portrayed attached to its lift arms and to its bucket control cylinders is driven with the lift arms slightly raised into close proximity with a tree stump to be removed. The skid steer loader is positioned so that the cutting wheel 30 overlies the edge of the tree stump. The lift arms of the skid steer loader are then lowered until rollers 40 rotatably attached to the lower edge of the shield plate 5 come into contact with the ground. The hydraulic power system of the skid steer loader is then actuated to provide hydraulic fluid flow to its power forward line, said flow passing into the high pressure line 38. The hydraulic fluid flow then passes through the hydraulic motor high pressure line 26, powering the hydraulic motor 25 and causing the cutting wheel 30 to commence spinning, as viewed, in a counter-clockwise motion. The arm position control levers 42 and 43 are then manipulated either forward or rearward by the equipment operator to cause the cutting wheel 30 to selectively and universally move upwards, downwards, rightwards, or leftwards through the combined action of the arm control cylinders 15 and 20. Forward and rearward motion of the cutting wheel over the tree stump is achieved by selectively driving the skid steer loader forward or rearward, causing the stump cutting apparatus to roll forward or rearward upon its lower rollers 40.

Referring further to FIG. 1, an advantage of the side positioning of the cutting wheel extension arm 10 is that the equipment operator may simply step over the shield plate 5 and over the hydraulic cylinder 20 to gain forward access to the operator's seat of the skid steer loader. The side mounting of the extension arm 10 also allows an operator seated in the operator's seat of the skid steer loader to view the side of the cutting wheel 30 while it cuts away a tree stump. The side positioning of the extension arm 10 is further advantageous because rocks and wood chips thrown rearward by the rotating motion of the cutting wheel 30 are directed to the side of the equipment operator rather than directly toward the equipment operator. A further advantage of the side positioning of the extension arm 10 is increased maneuverability. For example, the skid steer loader may be driven parallel to a building or to a fence with the both side wheels adjacent to the building or fence. With the skid steer loader in such a position, the extension arm may extend parallel to the building or fence, and adjacent thereto for cutting and removing a tree stump located next to the building or fence.

Although the invention has been described with respect to a preferred embodiment thereof, it is to be understood that it is not to be so limited since changes and modifications can be made therein within the full intended scope of the invention as defined by the appended claims.

I claim:

1. An auxiliary tree stump cutting apparatus for attachment to a skid steer front loader construction vehicle, the skid steer front loader construction vehicle having parallel left and right lift arms, the left and right lift arms each having a front end and a pivoting end, the pivoting ends of the left and right lift arms being respectively pivotally mounted upon opposing left and right sides of the skid steer front loader construction vehicle, the skid steer front loader construction vehicle having an operator's seat mounted thereon and positioned between the left and right lift arms, and the skid steer front loader construction vehicle having an hydraulic power system; the auxiliary tree stump cutting apparatus comprising:

(A) A support structure having a front side, a back side, a right side, and a left side, the back side of support structure having a plurality of attachment means adapting the support structure for fixed attachment to the front ends of the left and right lift arms of the skid steer front loader construction vehicle so that the support structure may span between, and may be supported by said left and right lift arms; and, (B) A cutting wheel extension arm having a base and a front end, the base of the cutting wheel extension arm being pivotally mounted upon the support structure and being positioned thereon so that, upon attachment of the support structure to span between the front ends of the left and right lift arms of the skid steer front loader construction vehicle, the operator's seat will lie between one of the lift arms and a vertical plane, the vertical plane being parallel to the lift arms, and the vertical plane passing through the base of the cutting wheel extension arm.

2. The apparatus of claim No. 1, wherein the base of the cutting wheel extension arm is further positioned on the support structure so that either the left or the right lift arm lies between the operator's seat and the vertical plane.

3. The apparatus of claim No. 2, wherein the base of the cutting wheel extension arm is further positioned on the support structure shielding plate at either the left or the right side of the support structure.

4. The apparatus of claim No. 1, wherein the cutting wheel extension arm extends outwardly from the front side of the support structure and wherein the pivotal mounting allows horizontal pivotal motion of the cutting wheel extension arm, and allows vertical pivotal motion of the cutting wheel extension arm.

5. The apparatus of claim No. 4 further comprising a stump cutting wheel rotatably mounted on the front end of the cutting wheel extension arm.

6. The apparatus of claim No. 5, wherein the stump cutting wheel is rotatably driven by an hydraulic motor.

7. The apparatus of claim No. 6, wherein horizontal pivotal motion of the cutting wheel extension arm and vertical pivotal motion of the cutting wheel extension arm are each controlled by hydraulic positioning means.

8. The apparatus of claim No. 7, wherein at least one of the hydraulic positioning means comprises an hydraulic cylinder.

9. The apparatus of claim No. 8 further comprising a network of hydraulic lines and hydraulic valves fixedly attached to the hydraulic motor and to the hydraulic positioning means, the network of hydraulic lines and hydraulic valves being adapted for attachment to the hydraulic power system of the skid steer front loader construction vehicle.

10. The apparatus of claim No. 2, wherein the cutting wheel extension arm extends outwardly from the front side of the support structure and wherein the pivotal mounting allows horizontal pivotal motion of the cutting wheel extension arm, and allows vertical pivotal motion of the cutting wheel extension arm.

11. The apparatus of claim No. 10 further comprising a stump cutting wheel rotatably mounted on the front end of the cutting wheel extension arm.

12. The apparatus of claim No. 11, wherein the stump cutting wheel is rotatably driven by an hydraulic motor.

13. The apparatus of claim No. 12, wherein horizontal pivotal motion of the cutting wheel extension arm and vertical pivotal motion of the cutting wheel extension arm are each controlled by hydraulic positioning means.

14. The apparatus of claim No. 13, wherein at least one of the hydraulic positioning means comprises an hydraulic cylinder.

15. The apparatus of claim No. 14 further comprising a network of hydraulic lines and hydraulic valves fixedly attached to the hydraulic motor and to the hydraulic positioning means, the network of hydraulic lines and hydraulic valves being adapted for attachment to the hydraulic power system of the skid steer front loader construction vehicle.

16. The apparatus of claim No. 3, wherein the cutting wheel extension arm extends outwardly from the front side of the support structure and wherein the pivotal mounting allows horizontal pivotal motion of the cutting wheel extension arm, and allows vertical pivotal motion of the cutting wheel extension arm.

17. The apparatus of claim No. 16 further comprising a stump cutting wheel rotatably mounted on the front end of the cutting wheel extension arm.

18. The apparatus of claim No. 17, wherein the stump cutting wheel is rotatably driven by an hydraulic motor.

19. The apparatus of claim No. 18, wherein horizontal pivotal motion of the cutting wheel extension arm and vertical pivotal motion of the cutting wheel extension arm are each controlled by hydraulic positioning means.

20. The apparatus of claim No. 19, wherein at least one of the hydraulic positioning means comprises an hydraulic cylinder.

21. The apparatus of claim No. 20 further comprising a network of hydraulic lines and hydraulic valves fixedly attached to the hydraulic motor and to the hydraulic positioning means, the network of hydraulic lines and hydraulic valves being adapted for attachment to the hydraulic power system of the skid steer front loader construction vehicle.

22. The apparatus of claim No. 9, wherein the support structure comprises a flying debris shielding plate.

23. The apparatus of claim No. 15, wherein the support structure comprises a flying debris shielding plate.

24. The apparatus of claim No. 21, wherein the support structure comprises a flying debris shielding plate.

* * * * *